US010854050B2

(12) United States Patent
Mixter et al.

(10) Patent No.: US 10,854,050 B2
(45) Date of Patent: *Dec. 1, 2020

(54) SERVER-PROVIDED VISUAL OUTPUT AT A VOICE INTERFACE DEVICE

(71) Applicant: GOOGLE LLC, Mountain View, CA (US)

(72) Inventors: Kenneth Mixter, Los Altos Hills, CA (US); Yuan Yuan, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,648

(22) Filed: Jul. 2, 2019

(65) Prior Publication Data
US 2019/0385418 A1 Dec. 19, 2019

Related U.S. Application Data

(63) Continuation of application No. 15/815,646, filed on Nov. 16, 2017, now Pat. No. 10,339,769.
(Continued)

(51) Int. Cl.
G08B 21/00 (2006.01)
G08B 5/36 (2006.01)
(Continued)

(52) U.S. Cl.
CPC ............... G08B 5/36 (2013.01); G06F 3/167 (2013.01); G08B 3/10 (2013.01); G09G 3/14 (2013.01);
(Continued)

(58) Field of Classification Search
CPC ... G08B 3/10; G08B 5/36; G09G 3/14; G10L 15/22
(Continued)

(56) References Cited

U.S. PATENT DOCUMENTS 9,304,736 B1    4/2016  Whiteley
2004/0128065 A1  7/2004  Taylor et al.
(Continued)

OTHER PUBLICATIONS

Google, Combined Search and Examination Report, under Sections 17 and 18 (3), Application No. GB1719037.2, dated May 17, 2018, 8 pgs.
(Continued)

Primary Examiner — Mark S Rushing
(74) Attorney, Agent, or Firm — Morgan, Lewis & Bockius LLP

(57) ABSTRACT

A method at an electronic device with an array of indicator lights includes: obtaining first visual output instructions stored at the electronic device, where the first visual output instructions control operation of the array of indicator lights based on operating state of the electronic device; receiving a voice input; obtaining from a remote system a response to the voice input and second visual output instructions, where the second visual output instructions are provided by the remote system along with the response in accordance with a determination that the voice input satisfies one or more criteria; executing the response; and displaying visual output on the array of indicator lights in accordance with the second visual output instructions, where otherwise in absence of the second visual output instructions the electronic device displays visual output on the array of indicator lights in accordance with the first visual output instructions.

20 Claims, 8 Drawing Sheets
(1 of 8 Drawing Sheet(s) Filed in Color)

Related U.S. Application Data

(60) Provisional application No. 62/424,354, filed on Nov. 18, 2016.

(51) Int. Cl.
| | | |
|---|---|---|
| *G06F 3/16* | (2006.01) | |
| *H04L 12/28* | (2006.01) | |
| *G08B 3/10* | (2006.01) | |
| *G09G 3/14* | (2006.01) | |
| *G10L 15/22* | (2006.01) | |

(52) U.S. Cl.
CPC ............ *G10L 15/22* (2013.01); *H04L 12/282* (2013.01); *H04L 12/2825* (2013.01); *G10L 2015/225* (2013.01)

(58) Field of Classification Search
USPC ........................................................ 340/332
See application file for complete search history.

(56) References Cited

U.S. PATENT DOCUMENTS

| | | |
|---|---|---|
| 2012/0036121 A1 | 2/2012 | Jitkoff et al. |
| 2015/0040012 A1 | 2/2015 | Faaborg et al. |
| 2015/0261496 A1 | 9/2015 | Faaborg et al. |
| 2015/0314454 A1 | 11/2015 | Breazeal et al. |
| 2015/0331666 A1 | 11/2015 | Bucsa et al. |
| 2016/0286169 A1 | 9/2016 | Sannala |

OTHER PUBLICATIONS

Google LLC, International Preliminary Report on Patentability, PCT/US2017/062376, dated May 21, 2019, 8 pgs.

Google LLC, International Search Report on Patenabilty, PCT/US2017/062376, dated Feb. 21, 2018, 10 pgs.

Google LLC, Notification on Entering the Substantive Examination Procedure, CN Application No. 201711160910.6, Nov. 26, 2018, 3 pgs.

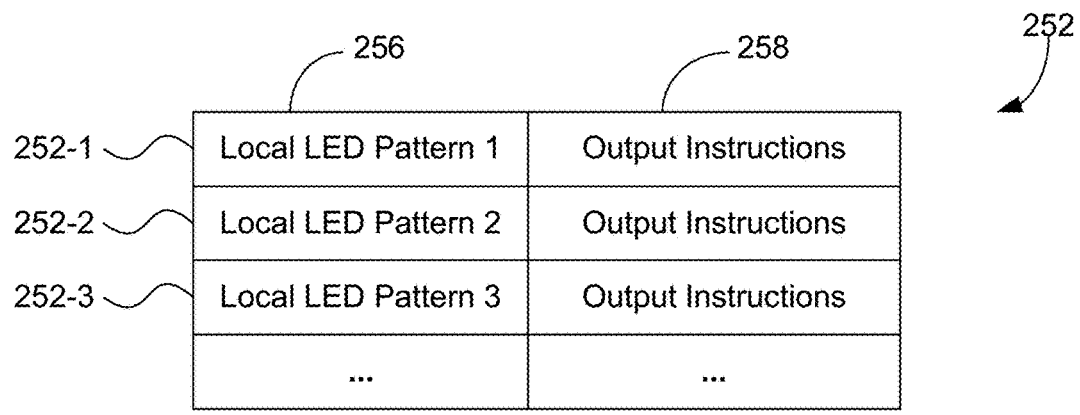
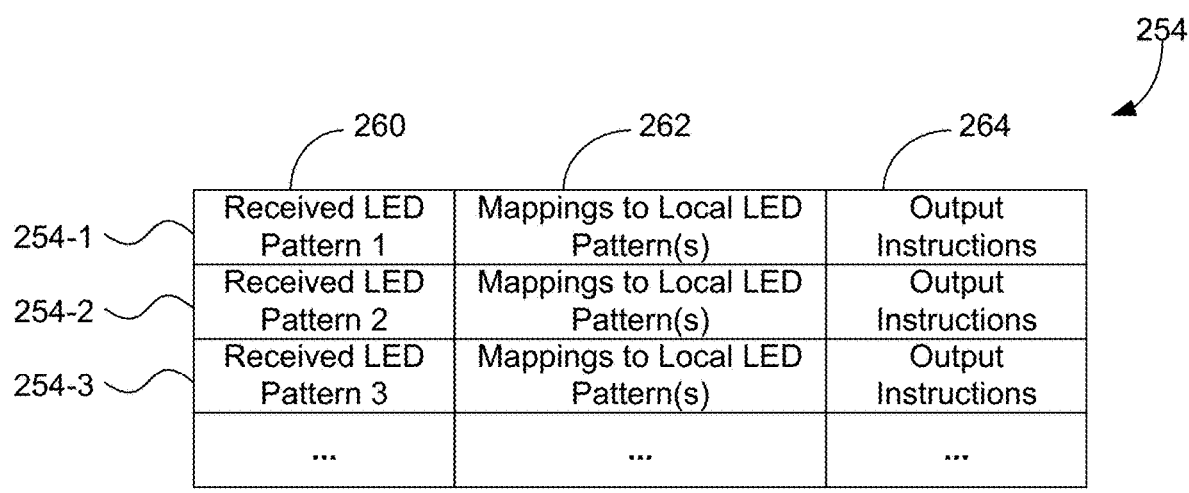
Figure 2B

500

At an electronic device with one or more microphones, a speaker, an array of indicator lights, one or more processors, and memory storing one or more programs for execution by the one or more processors Obtain first visual output instructions stored at the electronic device, where the first visual output instructions control operation of the array of indicator lights based on operating state of the electronic device, including operating states of applications executing thereon — 502

Obtain from a remote system second visual output instructions — 504

Perform an operation — 506

In association with performing the operation, determine whether one or more alternate visual output criteria are satisfied — 508

In accordance with a determination that the alternate visual output criteria are satisfied, display visual output on the array of indicator lights in accordance with the second visual output instructions — 510

In accordance with the determination that the alternate visual output criteria are not satisfied, display visual output on the array of indicator lights in accordance with the first visual output instructions — 512

Figure 5

SERVER-PROVIDED VISUAL OUTPUT AT A VOICE INTERFACE DEVICE

RELATED APPLICATIONS

This application is a continuation of and claims priority to U.S. patent application Ser. No. 15/815,646, titled "Server-Provided Visual Output at a Voice Interface Device," filed on Nov. 16, 2017, now U.S. Pat. No. 10,339,769, which claims the benefit of U.S. Provisional Patent Application No. 62/424,354, entitled "Server-Provided Visual Output at a Voice Interface Device," filed on Nov. 18, 2016, each of which is incorporated by reference herein in its entirety.

This application is related to the following U.S. patent applications, which are incorporated by reference herein in their entirety: U.S. patent application Ser. No. 15/592,137, entitled "Implementations for Voice Assistant on Devices," filed May 10, 2017, which claims the benefit of Provisional Patent Application No. 62/334,434, entitled "Implementations for Voice Assistant on Devices," filed May 10, 2016; and U.S. patent application Ser. No. 15/592,120, entitled "LED Design Language for Visual Affordance of Voice User Interfaces," filed May 10, 2017, which claims the benefit of U.S. Provisional Patent Application No. 62/336,566, entitled "LED Design Language for Visual Affordance of Voice User Interfaces," filed May 13, 2016.

TECHNICAL FIELD

The disclosed implementations relate generally to voice interfaces and related devices, including but not limited methods and systems for directing a voice interface device to display visual output in accordance with remotely provided instructions.

BACKGROUND

Electronic devices with voice interfaces have been widely used to collect voice inputs from users and perform different voice-activated functions according to the voice inputs. These voice-activated functions may include directing or commanding a target device to perform an operation. For example, the user may utter a voice input to a voice interface device to direct a target device to turn on or off, or to control media playback at the target device.

A voice interface device with a voice interface may display various visual outputs during operation. The voice interface device may display information on a display or with lights. The visual output that is displayed may be standardized or default based on the situation. For example, a particular visual output may be displayed to convey a particular status whenever that status is in effect. However, at times standardized or default visual output may be aesthetically unsatisfactory and unengaging to the user.

SUMMARY

Accordingly, there is a need for an electronic device with a voice assistant system and/or a voice assistant server system that incorporates methods and systems for providing alternative visual output to a voice interface device for display in lieu of standard or default visual output in certain situations. In various implementations described in this application, an operating environment includes a voice-activated electronic device that provides an interface to a voice assistant service, and optionally one or more devices (e.g., cast device, smart home device) that may be controlled by voice input via the voice assistant service. The voice-activated electronic device is configured to, by default, display a particular visual output in a particular situation. If a voice input satisfies certain criteria, non-default visual output may be displayed in lieu of the default visual output for the same particular situation. The instructions or information for the non-default visual output is provided by a server system (e.g., a voice assistance server system).

In accordance with some implementations, a method at an electronic device with one or more microphones, a speaker, an array of indicator lights, one or more processors, and memory storing one or more programs for execution by the one or more processors includes: obtaining first visual output instructions stored at the electronic device, where the first visual output instructions control operation of the array of indicator lights based on operating state of the electronic device, including operating states of applications executing thereon; receiving a voice input; obtaining from a remote system a response to the voice input and second visual output instructions, where the second visual output instructions are provided by the remote system along with the response in accordance with a determination that the voice input satisfies one or more criteria; executing the response; and displaying visual output on the array of indicator lights in accordance with the second visual output instructions, where otherwise in absence of the second visual output instructions the electronic device displays visual output on the array of indicator lights in accordance with the first visual output instructions.

In accordance with some implementations, an electronic device includes one or more microphones, a speaker, an array of indicator lights, one or more processors, and memory storing one or more programs to be executed by the one or more processors. The one or more programs include instructions for: obtaining first visual output instructions stored at the electronic device, where the first visual output instructions control operation of the array of indicator lights based on operating state of the electronic device, including operating states of applications executing thereon; receiving a voice input; obtaining from a remote system a response to the voice input and second visual output instructions, where the second visual output instructions are provided by the remote system along with the response in accordance with a determination that the voice input satisfies one or more criteria; executing the response; and displaying visual output on the array of indicator lights in accordance with the second visual output instructions, where otherwise in absence of the second visual output instructions the electronic device displays visual output on the array of indicator lights in accordance with the first visual output instructions.

In accordance with some implementations, a non-transitory computer readable storage medium stores one or more programs, the one or more programs includes instructions, which, when executed by an electronic device with one or more microphones, a speaker, an array of indicator lights, and one or more processors, cause the electronic device to perform operations including: obtaining first visual output instructions stored at the electronic device, where the first visual output instructions control operation of the array of indicator lights based on operating state of the electronic device, including operating states of applications executing thereon; receiving a voice input; obtaining from a remote system a response to the voice input and second visual output instructions, where the second visual output instructions are provided by the remote system along with the response in accordance with a determination that the voice input satisfies one or more criteria; executing the response;

and displaying visual output on the array of indicator lights in accordance with the second visual output instructions, where otherwise in absence of the second visual output instructions the electronic device displays visual output on the array of indicator lights in accordance with the first visual output instructions.

In accordance with some implementations, a method at an electronic device with one or more microphones, a speaker, an array of indicator lights, one or more processors, and memory storing one or more programs for execution by the one or more processors includes: obtaining first visual output instructions stored at the electronic device, where the first visual output instructions control operation of the array of indicator lights based on operating state of the electronic device, including operating states of applications executing thereon; obtaining from a remote system second visual output instructions; performing an operation; in association with performing the operation, determining whether one or more alternate visual output criteria are satisfied; in accordance with a determination that the alternate visual output criteria are satisfied, displaying visual output on the array of indicator lights in accordance with the second visual output instructions; and in accordance with the determination that the alternate visual output criteria are not satisfied, displaying visual output on the array of indicator lights in accordance with the first visual output instructions.

In accordance with some implementations, an electronic device includes one or more microphones, a speaker, an array of indicator lights, one or more processors, and memory storing one or more programs to be executed by the one or more processors. The one or more programs include instructions for: obtaining first visual output instructions stored at the electronic device, where the first visual output instructions control operation of the array of indicator lights based on operating state of the electronic device, including operating states of applications executing thereon; obtaining from a remote system second visual output instructions; performing an operation; in association with performing the operation, determining whether one or more alternate visual output criteria are satisfied; in accordance with a determination that the alternate visual output criteria are satisfied, displaying visual output on the array of indicator lights in accordance with the second visual output instructions; and in accordance with the determination that the alternate visual output criteria are not satisfied, displaying visual output on the array of indicator lights in accordance with the first visual output instructions.

In accordance with some implementations, a non-transitory computer readable storage medium stores one or more programs, the one or more programs includes instructions, which, when executed by an electronic device with one or more microphones, a speaker, an array of indicator lights, and one or more processors, cause the electronic device to perform operations including: obtaining first visual output instructions stored at the electronic device, where the first visual output instructions control operation of the array of indicator lights based on operating state of the electronic device, including operating states of applications executing thereon; obtaining from a remote system second visual output instructions; performing an operation; in association with performing the operation, determining whether one or more alternate visual output criteria are satisfied; in accordance with a determination that the alternate visual output criteria are satisfied, displaying visual output on the array of indicator lights in accordance with the second visual output instructions; and in accordance with the determination that the alternate visual output criteria are not satisfied, displaying visual output on the array of indicator lights in accordance with the first visual output instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

FIG. 2B illustrates example data structures for LED output instructions in accordance with some implementations.

FIG. 5 illustrates a flow diagram of an example process of displaying a server-provided alternate LED pattern, in accordance with some implementations.

Like reference numerals refer to corresponding parts throughout the several views of the drawings.

DESCRIPTION OF IMPLEMENTATIONS

Figure 1:
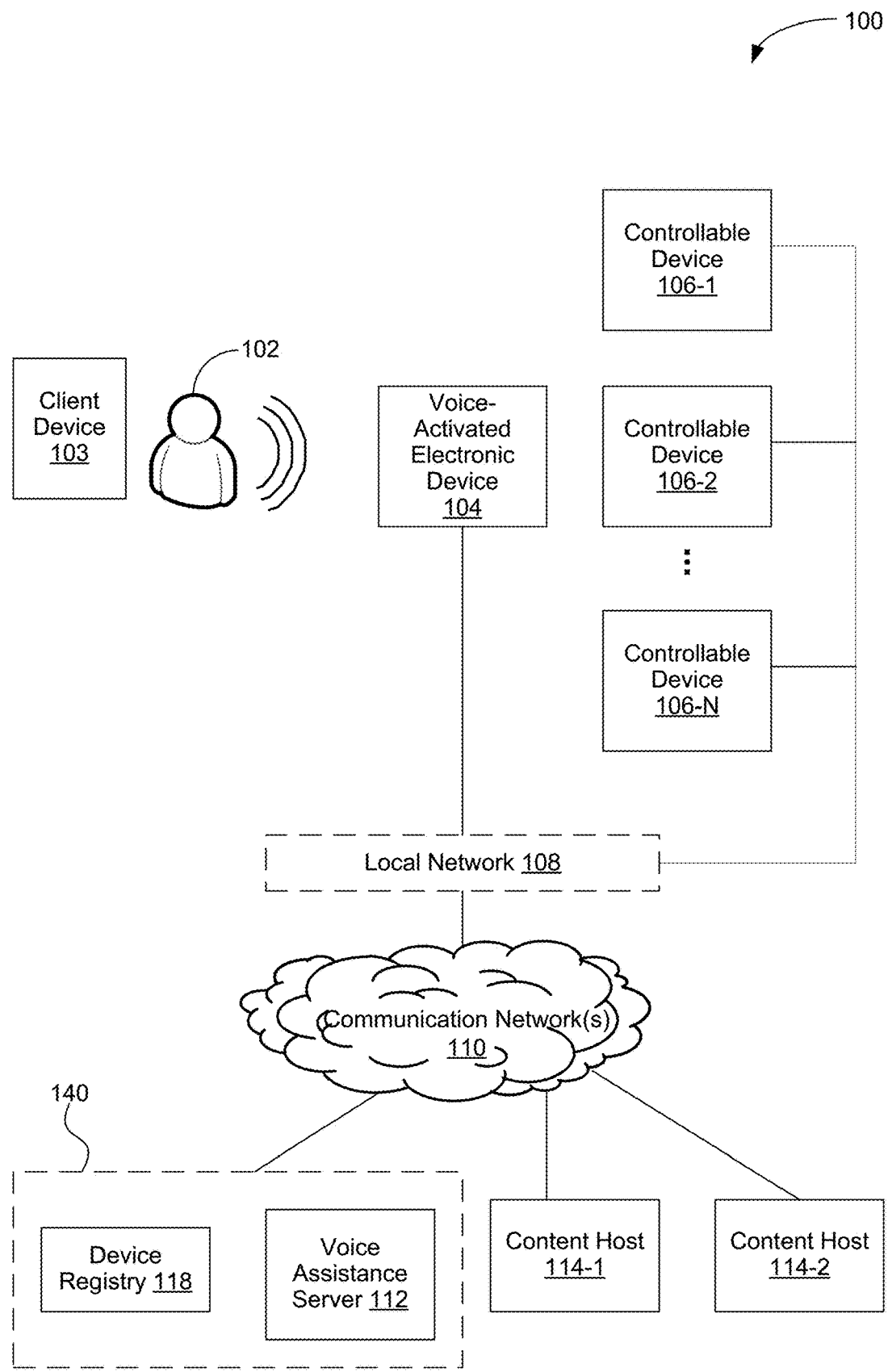
FIG. 1 illustrates an example operating environment in accordance with some implementations.

While the digital revolution has provided many benefits ranging from openly sharing information to a sense of global community, emerging new technology often induces confusion, skepticism and fear among consumers, preventing consumers from benefiting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at the electronic device can carry instructions and information even if a user's line of sight is obscured and his hands are full. To enable a hands-free and eyes-free experience, the voice-activated electronic device listens to the ambient (i.e., constantly processes audio signals collected from the ambient) constantly or only when triggered.

Devices with voice interfaces, such as speakers, or home automation hubs, or security systems, may have minimal visual surfaces. These surfaces may be implemented using a limited number of light emitting diodes (LEDs). The LEDs may be used to indicate device functionality states such as listening to user voice input, processing voice input, obtaining information in response to a voice input, or responding to a voice input. For specific queries it may be useful to indicate a state using a different visual output than a default visual output for the same state.

In some implementations, a server system (e.g., a voice assistance server system of a voice assistant service) may process user requests included in voice inputs, and a voice-activated electronic device has visual outputs built in. For some user requests, non-default, alternative visual outputs are available and are sent from the server system to the voice-activated electronic device (e.g., along with the response generated by the server system). The device may use the alternative visual output to substitute for a default visual output. For example, on a holiday the device shows visual output that includes holiday specific lighting when the user asks for his schedule, says good morning, or asks for holiday specific songs. As another example, games can show whose turn it is, if responses were right or wrong, etc. with non-default visual output. Because built-in, default visual outputs are used for most visual responses of the voice-activated electronic device, communication bandwidth is saved between the server system and voice-activated devices (since the server does not need to transmit a visual output along with a response to most user requests).

In accordance with some implementations, a voice-activated electronic device may display non-default, alternate visual output in accordance with a determination that a voice input satisfies one or more criteria. The non-default, alternate visual output may be displayed in lieu of a default visual output when otherwise the default visual output would have been displayed. The information or instructions for displaying the non-default visual output is provided by a remote system (e.g., a server system).

In this way, different visual output may be displayed on the device, providing information to the user in a visually engaging and evocative manner.

Voice Assistant Operating Environment

FIG. 1 is an example operating environment in accordance with some implementations. Operating environment 100 includes one or more voice-activated electronic devices 104 (hereinafter "voice-activated device(s)"). The one or more voice-activated devices 104 may be located in one or more locations (e.g., all in a room or space of a structure, spread out throughout multiple spaces within a structure or throughout multiple structures (e.g., one in a house and one in the user's car)). For sake of simplicity, operating environment 100 is depicted as having one voice-activated device 104.

Optionally, the environment 100 also includes one or more controllable electronic devices 106 (e.g., electronic device 106-1 thru 106-N, hereinafter "controllable device(s)"). Examples of controllable devices 106 include media devices (smart televisions, speaker systems, wireless speakers, set-top boxes, media streaming devices, cast devices), and smart home devices (e.g., smart camera, smart thermostat, smart light, smart hazard detector, smart door lock).

The voice-activated device 104 and the controllable devices 106 are communicatively coupled, through communication networks 110, to a voice assistant service 140 (e.g., to a voice assistance server system 112 of the voice assistant service 140). In some implementations, any number of voice-activated devices 104 and controllable devices 106 are communicatively coupled to a local network 108, which is communicatively coupled to the communication networks 110; the voice-activated device 104 and/or the controllable device(s) 106 are communicatively coupled to communication network(s) 110 (and, through the communication networks 110, to the voice assistance server system 112) via the local network 108. In some implementations, the local network 108 is a local area network implemented at a network interface (e.g., a router). The voice-activated device 104 and the controllable devices 106 that are communicatively coupled to the local network 108 may also communicate with each other through the local network 108.

Optionally, the voice-activated device 104 is communicatively coupled to the communication networks 110, and is not on the local network 108. For example, a voice-activated device in the operating environment 100 may be not on the Wi-Fi network corresponding to the local network 108 but is still coupled to the communication networks 110 (e.g., through a cellular connection). In some implementations, communication between voice-activated devices that are on the local network 108 and voice-activated devices that are not on the local network 108 are done through the voice assistance server system 112. The voice-activated device 104 (whether on the local network 108 or on the network 110) is registered in a device registry 118 of the voice assistant service 140 and thus known to the voice assistance server system 112. Similarly, a voice-activated device 104 that is not on the local network 108 may communicate with controllable devices 106 through the voice assistant server system 112. The controllable devices 106 (whether on the local network 108 or on the network 110) are also registered in the device registry 118. In some implementations, communications between the voice-activated device 104 and the controllable devices 106 go through the voice assistance server system 112.

In some implementations, the environment 100 also includes one or more content hosts 114. A content host 114 may be a remote content source from which content is streamed or otherwise obtained in accordance with a request included in a user voice input or command. A content host 114 may be an information source from which the voice assistance server system 112 retrieves information in accordance with a user voice request.

In some implementations, controllable devices 106 are capable of receiving commands or requests to perform specified operations or to transition to specified states (e.g., from the voice-activated device 104 and/or the voice assistance server system 112) and to perform the operations or transition states in accordance with the received commands or requests.

In some implementations, one or more of the controllable devices 106 are media devices that are disposed in the operating environment 100 to provide to one or more users media content, news and/or other information. In some implementations, the content provided by the media devices is stored at a local content source, streamed from a remote content source (e.g., content host(s) 114), or generated locally (e.g., through a local text to voice processor that reads a customized news briefing, emails, texts, a local weather report, etc. to one or more occupants of the operating environment 100). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast™ media streaming device.

In some implementations, a controllable device 106 is also a voice-activated device 104. In some implementations, a voice-activated device 104 is also a controllable device 106. For example, a controllable device 106 may include a voice interface to the voice assistance service 140 (e.g., a media device that can also receive, process, and respond to user voice inputs). As another example, a voice-activated device 104 may also perform particular operations and transition to particular states in accordance with requests or commands in voice inputs (e.g., a voice interface device that can also play streaming music, read out emails, tell the time, run a timer, etc.).

In some implementations, the voice-activated device 104 and the controllable devices 106 are associated with a user having a respective account, or with multiple users (e.g., a group of related users, such as users in a family or in an organization; more generally, a primary user and one or more authorized additional users) having respective user accounts, in a user domain. A user may make voice inputs or voice commands to the voice-activated device 104. The voice-activated device 104 receives these voice inputs from the user (e.g., user 102), and the voice-activated device 104 and/or the voice assistance server system 112 proceeds to determine a request in the voice input and generate a response to the request.

In some implementations, the request included in a voice input is a command or request to a controllable device 106 to perform an operation (e.g., play media, pause media, fast forward or rewind media, change volume, change screen brightness, change light brightness) or transition to another state (e.g., change the mode of operation, turn on or off, go into sleep mode or wake from sleep mode).

In some implementations, a voice-activated device 104 responds to voice inputs by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment 100 (e.g., turning lights, appliances or media devices on/off, locking/unlocking a lock, opening windows, etc.); or issuing a corresponding request to a server via a network 110.

In some implementations, the voice-activated device 104 is disposed in the operating environment 100 to collect audio inputs for initiating various functions (e.g., media play functions of the media devices). In some implementations, the voice-activated device 104 is disposed in proximity to a controllable device 104 (e.g., a media device), for example, in the same room with the cast devices and the media output devices. Alternatively, in some implementations, the voice-activated device 104 is disposed in a structure having one or more smart home devices but not any media device. Alternatively, in some implementations, the voice-activated device 104 is disposed in a structure having one or more smart home devices and one or more media devices. Alternatively, in some implementations, the voice-activated device 104 is disposed in a location having no networked electronic device. Further, in some implementations, a room or space in the structure may have multiple voice-activated devices 104.

In some implementations, the voice-activated device 104 includes at least one or more microphones, a speaker, a processor and memory storing at least one program for execution by the processor. The speaker is configured to allow the voice-activated device 104 to deliver voice messages and other audio (e.g., audible tones) to a location where the voice-activated device 104 is located in the operating environment 100, thereby broadcasting music, reporting a state of audio input processing, having a conversation with or giving instructions to a user of the voice-activated device 104. In addition to or as an alternative to the voice messages, visual signals may be used to provide feedback to the user of the voice-activated device 104 concerning the state of audio input processing, the state or status of the voice-activated device 104, or the state or status of an application or module running on the device 104. When the voice-activated device 104 is a mobile device (e.g., a mobile phone or a tablet computer), its display screen is configured to display a notification concerning the state of audio input processing or the device state or status or an applications state or status.

In some implementations, the voice-activated device 104 is a voice interface device that is network-connected to provide voice recognition functions with the aid of a voice assistance server system 112. For example, the voice-activated device 104 includes a smart speaker that provides music to a user and allows eyes-free and hands-free access to a voice assistant service (e.g., Google Assistant). Optionally, the voice-activated device 104 is one of a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, a user interface system integrated with another device or an appliance (e.g., a user interface system integrated with a refrigerator) that includes a microphone and a speaker and optionally a display, and a user interface system in an automobile that includes a microphone and a speaker and optionally a display. Optionally, the voice-activated device 104 is a simple and low cost voice interface device. Generally, the voice-activated device 104 may be any device that is capable of network connection and that includes a microphone, a speaker, and programs, modules, and data for interacting with the voice assistant service 140. Given simplicity and low cost of the voice-activated device 104, the voice-activated device 104 includes an array of light emitting diodes (LEDs) rather than a full display screen, and displays a visual pattern on the LEDs to indicate the state of audio input processing, a device state or status, or an application state or status. In some implementations, the LEDs are full color LEDs, and the colors of the LEDs may be employed as a part of the visual pattern to be displayed on the LEDs. For example, multiple examples of using LEDs to display visual patterns in order to convey information or device status are described below in reference to FIGS. 6A-6D of this application and in reference to FIGS. 4A-4H of U.S. Provisional Patent Application No. 62/336, 566, entitled "LED Design Language for Visual Affordance of Voice User Interfaces," filed May 13, 2016, which is incorporated by reference in its entirety. In some implementations, visual patterns indicating the state of voice processing operations or device state/status or application state/status are displayed using characteristic images shown on conventional displays associated with voice-activated devices that are performing the voice processing operations.

In some implementations, LEDs or other visual displays are used to convey a collective voice processing state of multiple participating electronic devices. For example, in an operating environment where there are multiple voice processing or voice interface devices (e.g., multiple electronic devices 104 as shown in FIG. 6A of this applications and FIG. 4A of the '566 application; and multiple voice-activated devices 104 of FIG. 1), groups of color LEDs (e.g., LEDs 404 as shown in FIG. 4A of the '566 application and 604 of FIG. 6A) associated with respective electronic devices can be used to convey which of the electronic devices is listening to a user.

More generally, the discussions below with reference to FIGS. 6A-6D and in the '566 application (e.g., see paras. [0087]-[0100]) describe a "LED Design Language" for indicating visually using a collection of LEDs a variety of voice processing states of an electronic device, such as a hot word detection state, a listening state, a thinking mode, a working mode, a responding mode, and/or a speaking mode. In some implementations, unique states of voice processing operations described herein are represented using a group of LEDs in accordance with one or more aspects of the "LED Design Language." of the '566 application. These visual indicators can also be combined with one or more audible indicators generated by electronic devices that are performing voice processing operations. The resulting audio and/or visual indicators will enable users in a voice-interactive environment to understand the state of various voice processing electronic devices in the environment and to effectively interact with those devices in a natural, intuitive manner.

In some implementations, when voice inputs to the voice-activated device 104 are used to control the media output devices via the cast devices, the voice-activated device 104 effectively enables a new level of control of cast-enabled media devices. In a specific example, the voice-activated device 104 includes a casual enjoyment speaker with far-field voice access and functions as a voice interface device for the voice assistant service. The voice-activated device 104 may be disposed in any area in the operating environment 100. When multiple voice-activated devices 104 are distributed in multiple rooms, they become cast audio receivers that are synchronized to provide voice inputs from these rooms.

Specifically, in some implementations, the voice-activated device 104 includes a Wi-Fi speaker with a microphone that is connected to a voice-activated voice assistant service (e.g., Google Assistant). A user (e.g., user 102) can issue a media play request via the microphone of voice-activated device 104, and ask the voice assistant service 140 to play media content on the voice-activated device 104 or on another connected media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the voice-activated device 104, concerning media content that has already been played or is being played on a display device (e.g., the user can ask for information about the media content, buy the media content through an online store, or compose and issue a social post about the media content).

In some implementations, a user may want to take a current media session with them as they move through the house and can request such a service from one or more of the voice-activated devices 104. This requires the voice assistant service 140 to transfer the current media session from a first cast device to a second cast device that is not directly connected to the first cast device or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the voice-activated device 104 that receives the request to transfer the media session can satisfy the request. In some implementations, the voice-activated device 104 that receives the request to transfer the media session relays the request to another device or system (e.g., voice assistance server system 112) for handling.

Further, in some implementations, a user may issue, via the microphone of voice-activated device 104, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/operation may involve access to personal information (e.g., purchasing a digital media item with payment information provided by the user, purchasing a physical good). The voice-activated device 104 and/or the voice assistant service 140 responds to the request with voice message responses to the user, where the response may include, for example, requests for additional information to fulfill the request, confirmation that the request has been fulfilled, notice that the request cannot be fulfilled, and so forth. In some implementations, the request for information is an information-to-speech (e.g., text-to-speech) request, where the user is requesting that the requested information be read out loud (e.g., as speech) by the voice-activated device 104, or more generally, that the requested information be output by the voice-activated device 104 in an audible and human-understandable form. In some implementations, an application may be executed on the voice-activated device 104 and/or the voice assistant service 140, and the voice-activated device 104 serves as an interface to the application. For example, the voice-activated device 104 may run a trivia game application, and interface with game participants using voice prompts, voice output, and optionally visual output (e.g., light patterns displayed using the group of LEDs).

As an example, the user can issue an information-to-speech (e.g., text-to-speech) request via the microphone of voice-activated device 104, and ask the voice assistant service 140 to have information (e.g., emails, calendar events, news articles, sports scores, the current time, time remaining on a timer, etc.) read out loud on the voice-activated device 104. For example, the user can issue an information-to-speech request by saying to the voice interface device "OK Google, what do I have in my calendar today?". The voice assistant service 140 fulfils the information-to-speech request by reading out loud the requested information on the voice interface device voice-activated device 104.

In some implementations, in addition to the voice-activated device 104 and the media devices amongst the controllable devices 106, the operating environment 100 may also include one or more smart home devices amongst the controllable devices 106. The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device.

The smart home devices in the operating environment 100 may include, but are not limited to, one or more intelligent, multi-sensing, network-connected thermostats, one or more intelligent, network-connected, multi-sensing hazard detectors, one or more intelligent, multi-sensing, network-connected entryway interface devices and (hereinafter referred to as "smart doorbells" and "smart door locks"), one or more intelligent, multi-sensing, network-connected alarm systems, one or more intelligent, multi-sensing, network-connected camera systems, one or more intelligent, multi-sensing, network-connected wall switches, one or more intelligent, multi-sensing, network-connected power sockets, and one or more intelligent, multi-sensing, network-connected lights. In some implementations, the smart home devices in the operating environment 100 of FIG. 1 includes a plurality of intelligent, multi-sensing, network-connected appliances (hereinafter referred to as "smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, any one of these smart home device types can be outfitted with microphones and one or more voice processing capabilities as described herein so as to in whole or in part respond to voice requests from an occupant or user.

In some implementations, each of the controllable devices 104 and the voice-activated devices 104 is capable of data communications and information sharing with other controllable devices 106, voice-activated devices 104, a central server or cloud-computing system, and/or other devices (e.g., a client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 110, the controllable devices 106 and the voice-activated devices 104 may communicate with a server system (also called a central server system and/or a cloud-computing system herein). Optionally, the server system may be associated with a manufacturer, support entity, or service provider associated with the controllable devices and the media content displayed to the user. Accordingly, the server system includes the voice assistance server system 112 that processes audio inputs collected by voice-activated devices 104, one or more content hosts 114 that provide the displayed media content, optionally a cloud cast service server creating a virtual user domain based on distributed device terminals, and the device registry 118 that keeps a record of the distributed device terminals in the virtual user environment. Examples of the distributed device terminals include, but are not limited to the controllable devices 106, the voice-activated devices 104, and the media output devices. In some implementations, these distributed device terminals are linked to a user account (e.g., a Google user account) in the virtual user domain. It should be appreciated that processing of audio inputs collected by voice-activated devices 104 can be performed locally at a voice-activated device 104, at a voice assistance server system 112, at another smart home device (e.g., a hub device) or at some combination of all or subset of the above.

It will be appreciated that in some implementations the voice-activated device 104 also functions in an environment without smart home devices. For example, a voice-activated device 104 can, even in the absence of smart home devices, respond to user requests for information or performance of an action, and/or to initiate or control various media play functions. A voice-activated device 104 can also function in a wide range of environments, including, without limitation, a vehicle, a ship, a business, or a manufacturing environment.

In some implementations, a voice-activated device 104 is "awakened" (e.g., to activate an interface for the voice assistant service on the voice-activated device 104, to put the voice-activated device 104 into a state where the voice-activated device 104 is ready to receive voice requests to the voice assistant service) by a voice input that includes a hotword (also called a "wake word"). In some implementations, the voice-activated device 104 requires awakening if the voice-activated device 104 has been idle with respect to receipt of voice inputs for at least a predefined amount of time (e.g., 5 minutes); the predefined amount of time corresponds to an amount of idle time allowed before a voice interface session or conversation times out. The hotword may be a word or phrase, and may be a predefined default and/or may be customized by a user (e.g., a user may set a nickname for a particular voice-activated device 104 as the device's hotword). In some implementations, there may be multiple hotwords that can awaken a voice-activated device 104. A user may speak the hotword, wait for an acknowledgement response from the voice-activated device 104 (e.g., the voice-activated device 104 outputs a greeting), and them make a first voice request. Alternatively, the user may combine the hotword and the first voice request in one voice input (e.g., the voice input includes the hotword followed by the voice request).

In some implementations, a voice-activated device 104 interacts with a controllable device 106 (e.g., a media device, a smart home device), a client device (e.g., client device 103) or a server system (e.g., voice assistance server system 112) of an operating environment 100 in accordance with some implementations. The voice-activated device 104 is configured to receive audio inputs from an environment in proximity to the voice-activated device 104. Optionally, the voice-activated device 104 stores the audio inputs and at least partially processes the audio inputs locally. Optionally, the voice-activated device 104 transmits the received audio inputs or the partially processed audio inputs to a voice assistance server system 112 via the communication networks 110 for further processing. The voice-activated device 104 or the voice assistance server system 112 determines if there is a request in the audio input and what the request is, determines and generates a response to the request, and performs one or more operations to fulfil the request (e.g., obtaining requested information and converting the information to audible speech output, transmits the response to one or more controllable device(s) 106 in accordance with the request). The controllable device(s) 106 receiving the response, which may include one or more commands to the controllable device 106, is configured to perform operations or change states in accordance with the response. For example, a media device is configured to obtain media content or Internet content from one or more content hosts 114 for display on an output device coupled to the media device, in accordance with a response to a request in the audio input.

In some implementations, the controllable device(s) 106 and the voice-activated device 104 are linked to each other in a user domain, and more specifically, associated with each other via a user account in the user domain. Information on the controllable device 106 (whether on the local network 108 or on the network 110) and the voice-activated device 104 (whether on the local network 108 or on the network 110) are stored in the device registry 118 in association with the user account. In some implementations, there is a device registry for controllable devices 106 and a device registry for voice-activated devices 104. The controllable devices registry may reference devices in the voice-activated devices registry that are associated in the user domain, and vice versa.

In some implementations, one or more of the voice-activated devices 104 (and one or more cast devices) and one or more of the controllable devices 106 are commissioned to the voice assistant service 140 via a client device 103. In some implementations, the voice-activated device 104 does not include any display screen, and relies on the client device 103 to provide a user interface during a commissioning process, and similarly for a controllable device 106 as well. Specifically, the client device 103 is installed with an application that enables a user interface to facilitate commissioning of a new voice-activated device 104 and/or a controllable device 106 disposed in proximity to the client device. A user may send a request on the user interface of the client device 103 to initiate a commissioning process for the new electronic device 104 or 106 that needs to be commissioned. After receiving the commissioning request, the client device 103 establishes a short range communication link with the new electronic device 104 or 106 that needs to be commissioned. Optionally, the short range communication link is established based near field communication (NFC), Bluetooth, Bluetooth Low Energy (BLE) and the like. The client device 103 then conveys wireless configuration data associated with a wireless local area network (WLAN) (e.g., local network 108) to the new or electronic device 104 or 106. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new electronic device 104 or 106 decodes and recovers the wireless configuration data, and joins the WLAN based on the wireless configuration data.

In some implementations, additional user domain information is entered on the user interface displayed on the client device 103, and used to link the new electronic device 104 or 106 to an account in a user domain. Optionally, the additional user domain information is conveyed to the new electronic device 104 or 106 in conjunction with the wireless communication data via the short range communication link. Optionally, the additional user domain information is conveyed to the new electronic device 104 or 106 via the WLAN after the new device has joined the WLAN.

Once the electronic device 104 or 106 has been commissioned into the user domain, other devices and their associated activities may be controlled via multiple control paths. In accordance with one control path, an application installed on the client device 103 is used to control the other device and its associated activities (e.g., media play activities). Alternatively, in accordance with another control path, the electronic device 104 or 106 is used to enable eyes-free and hands-free control of the other device and its associated activities.

In some implementations, LEDs or other visual displays of the voice-activated device 104 are used to convey a state of the voice processing at the voice-activated device 104 and/or the voice assistance server system 112, a device state or status, or an application state or status. Particular states or statuses may be associated with particular default LED visual patterns. In some implementations, an LED visual pattern includes which LEDs to light up and when (e.g., in order to convey a pattern and/or motion of the lights) and the colors of the LEDs to be lit up. Generally, whenever a state or status is in effect at the voice-activated device 104, the voice-activated device 104 displays the corresponding LED pattern on the group of LEDs. In some implementations, instructions or data for default LED patterns and mappings of default LED patterns to particular states or statuses are stored locally at the voice-activated device.

In some implementations, if one or more criteria are met, an alternate LED pattern for display when a state or status is in effect is provided by the voice assistance service 140. The alternate LED pattern is displayed by the voice-activated device 104 in lieu of the default LED pattern when the default LED pattern would otherwise be displayed. In some implementations, information or data for the alternate LED pattern is transmitted from the voice assistant server system 112 to the voice-activated device 104 along with any response or command generated by the voice assistant server system 112 in response to a user's voice input. In some implementations, information or data for the alternate LED pattern is transmitted from the voice assistant server system 112 to the voice-activated device 104 at certain times independent of receipt or processing of voice inputs from users. In some implementations, alternate LED pattern information is stored at the voice-activated device 104 for a certain amount of time (e.g., cached in a cache, stored in memory and removed from the memory after a certain amount of time).

Devices in the Operating Environment

Figure 2A:
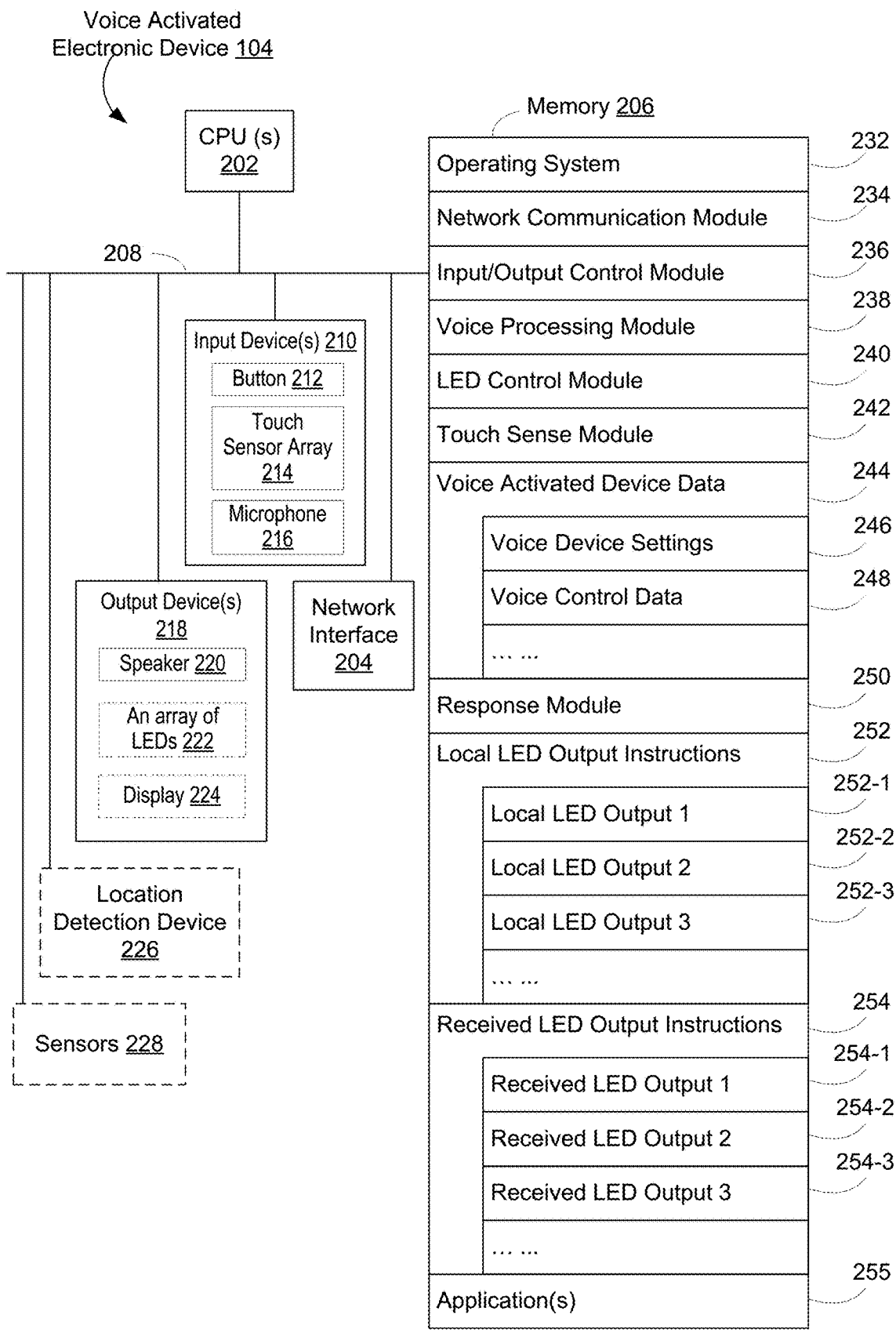
FIG. 2A illustrates an example voice-activated electronic device in accordance with some implementations.

FIG. 2 is a block diagram illustrating an example voice-activated device 104 that is applied as a voice interface to collect user voice commands in an operating environment (e.g., operating environment 100) in accordance with some implementations. The voice-activated device 104, typically, includes one or more processing units (CPUs) 202, one or more network interfaces 204, memory 206, and one or more communication buses 208 for interconnecting these components (sometimes called a chipset). The voice-activated device 104 includes one or more input devices 210 that facilitate user input, such as a button 212, (optionally) a touch sense array 214, and one or more microphones 216. The voice-activated device 104 also includes one or more output devices 218, including one or more speakers 220, and an array of LEDs 222 and/or a display 224. In some implementations, the array of LEDs 222 is an array of full color LEDs. In some implementations, a voice-activated device 104, depending on the type of device, has either the array of LEDs 222, or the display 224, or both. In some implementations, the voice-activated device 104 also includes a location detection device 226 (e.g., a GPS module) and one or more sensors 228 (e.g., accelerometer, gyroscope, light sensor, etc.).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- Operating system 232 including procedures for handling various basic system services and for performing hardware dependent tasks;
- Network communication module 234 for connecting the voice-activated device 104 to other devices (e.g., the voice assistance service 140, one or more controllable devices 106, one or more client devices 103, and other voice-activated device(s) 104) via one or more network interfaces 204 (wired or wireless) and one or more networks 110, such as the Internet, other wide area networks, local area networks (e.g., local network 108), metropolitan area networks, and so on;
- Input/output control module 236 for receiving inputs via one or more input devices and enabling presentation of information at the voice-activated device 104 via one or more output devices 218, including:
  - Voice processing module 238 for processing audio inputs or voice messages collected in an environment surrounding the voice-activated device 104, or preparing the collected audio inputs or voice messages for processing at a voice assistance server system 112;
  - LED control module 240 for generating visual patterns on the LEDs 222 according to device states of the voice-activated device 104 and according to LED output instructions 252 and 254; and
  - Touch sense module 242 for sensing touch events on a top surface (e.g., on touch sensor array 214) of the voice-activated device 104;
- Voice activated device data 244 for storing at least data associated with the voice-activated device 104, including:
  - Voice device settings 246 for storing information associated with the voice-activated device 104 itself, including common device settings (e.g., service tier, device model, storage capacity, processing capabilities, communication capabilities, etc.), information of one or more user accounts in a user domain, device nicknames and device groups, settings regarding restrictions when dealing with a non-registered user, and display specifications associated with one or more visual patterns displayed by the LEDs 222 (e.g., mappings of states and statuses to default LED output instructions); and
  - Voice control data 248 for storing audio signals, voice messages, response messages and other data related to voice interface functions of the voice-activated device 104;
- Response module 250 for performing instructions included in voice request responses generated by the voice assistance server system 112, and in some implementations, generating responses to certain voice inputs; and
- Local LED output instructions 252 for storing locally output instructions for LED patterns;
- Received LED output instructions 254 for storing alternate output instructions for LED patterns received from a voice assistance server system 112; and
- Application(s) 255 for performing particular operations or obtaining particular information. In some implementations, examples of applications 255 include a timer, an alarm clock, a unit converter, and so on.

In some implementations, the voice processing module 238 includes the following modules (not shown):
- User identification module for identifying and disambiguating users who provide voice inputs to the voice-activated device 104;
- Hotword recognition module for determining whether voice inputs include a hotword for waking up the voice-activated device 104 and recognizing such in the voice inputs; and
- Request recognition module for determining a user request included in a voice input.

FIG. 2B illustrates example data structures for local LED output instructions 252 and received LED output instructions 254 in accordance with some implementations. Local LED output instructions 252 store output instructions for standardized or default LED patterns to be displayed whenever certain states or statuses are in effect at the voice-activated device 104. The local LED output instructions 252 are stored in the memory 206, and include one or more sets of output instructions for respective output patterns (e.g., sets 252-1 thru 252-3).

In some implementations, the data structure for the local LED output instructions 252 include the following for an LED pattern output instructions set in the data structure:
- Output instructions set identifier 256, which may include an alphanumeric identifier value and/or a name; and
- Output instructions 258, which store the actual instructions or information based on which the LED control module 240 displays the LED pattern. The output instructions or information includes information such as, for example, a sequence of which LEDs to light up and when and the colors of the LEDs to be lit up.

Received LED output instructions 254 store alternate LED output instructions 350 (FIG. 3) for alternate LED patterns to be displayed in lieu of the standardized or default LED patterns whenever certain states or statuses are in effect at the voice-activated device 104 and one or more criteria are satisfied. The received LED output instructions 254 include alternate LED output instructions 350 that have been received from the voice assistance server system 112. The received LED output instructions 254 are stored in the memory 206 and may be removed from the memory 206 periodically (e.g., per a cache replacement policy), and include one or more sets of output instructions for respective output patterns (e.g., sets 254-1 thru 254-3).

In some implementations, the data structure for the received LED output instructions 254 include the following for an LED pattern output instructions set in the data structure:
- Output instructions set identifier 260, which may include an alphanumeric identifier value and/or a name;
- Mappings or correspondences 262 to one or more local LED pattern(s), which include identifiers of local LED patterns to which the received LED pattern is an alternative for display; and
- Output instructions 264, which store the actual instructions or information based on which the LED control module 240 displays the LED pattern. The output instructions or information includes information such as, for example, a sequence of which LEDs to light up and when and the colors of the LEDs to be lit up.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. In some implementations, a subset of the programs, modules, and/or data stored in the memory 206 can be stored on and/or executed by the voice assistance server system 112.

In some implementations, one or more of the modules in memory 206 described above are part of a voice processing library of modules. The voice processing library may be implemented and embedded on a wide variety of devices. An example of a voice processing library is described in U.S. Provisional Patent Application No. 62/334,434, entitled "Implementations for Voice Assistant on Devices," filed May 10, 2016, which is incorporated by reference herein in its entirety.

Figure 3:
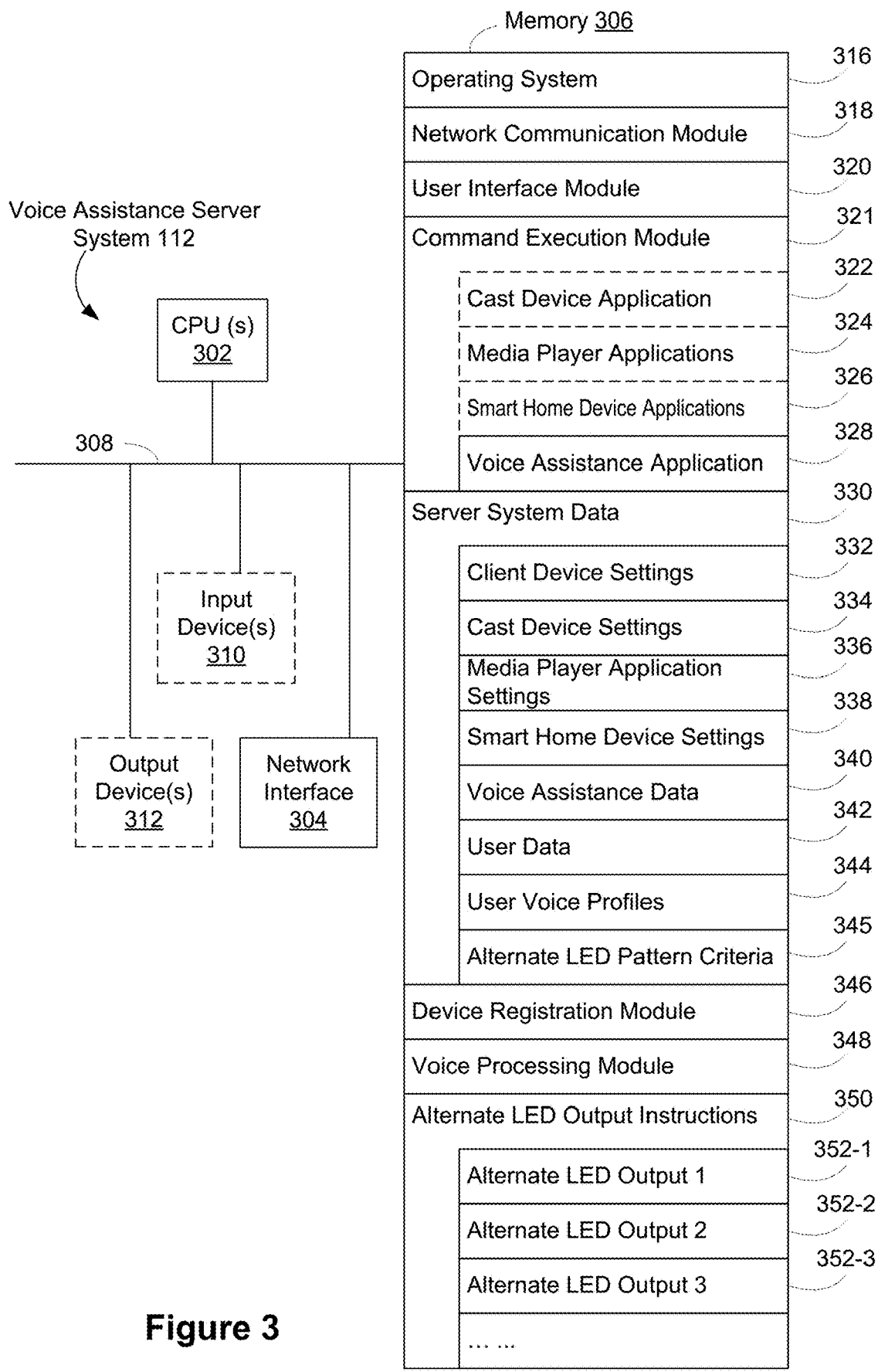
FIG. 3 illustrate an example voice assistance server system in accordance with some implementations.

FIG. 3 is a block diagram illustrating an example voice assistance server system 112 of a voice assistant service 140 of an operating environment (e.g., operating environment 100) in accordance with some implementations. The server system 112, typically, includes one or more processing units (CPUs) 302, one or more network interfaces 304, memory 306, and one or more communication buses 308 for interconnecting these components (sometimes called a chipset). The server system 112 may include one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server system 112 may use a microphone and voice recognition or a camera and gesture recognition to supplement or replace the keyboard. In some implementations, the server system 112 includes one or more cameras, scanners, or photo sensor units for capturing images, for example, of graphic series codes printed on the electronic devices. The server system 112 may also include one or more output devices 312 that enable presentation of user interfaces and display content, including one or more speakers and/or one or more visual displays.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the server system 112 to other devices (e.g., client devices 103, controllable devices 106, voice-activated devices 104) via one or more network interfaces 304 (wired or wireless) and one or more networks 110, such as the Internet, other wide area networks, local area networks, metropolitan area networks, and so on;
- User interface module 320 for enabling presentation of information (e.g., a graphical user interface for presenting application(s) 322-328, widgets, websites and web pages thereof, and/or games, audio and/or video content, text, etc.) at a client device;
- Command execution module 321 for execution on the server side (e.g., games, social network applications, smart home applications, and/or other web or non-web based applications for controlling a client device 103, a controllable device 106, a voice-activated device 104 and a smart home devices and reviewing data captured by such devices), including one or more of:
  - a cast device application 322 that is executed to provide server-side functionalities for device provisioning, device control, and user account management associated with cast device(s);
  - one or more media player applications 324 that is executed to provide server-side functionalities for media display and user account management associated with corresponding media sources;
  - one or more smart home device applications 326 that is executed to provide server-side functionalities for device provisioning, device control, data processing and data review of corresponding smart home devices; and
  - a voice assistance application 328 that is executed to arrange voice processing of a voice message received from the voice-activated device 104 or directly process the voice message to extract a user voice command and one or more parameters for the user voice command (e.g., a designation of a controllable device 106 device or another voice-activated device 104), including determining if one or more criteria for alternate LED patterns are satisfied;
- Server system data 330 storing at least data associated with automatic control of media display (e.g., in an automatic media output mode and a follow-up mode) and other data, including one or more of:
  - Client device settings 332 for storing information associated with one or more client device, including common device settings (e.g., service tier, device model, storage capacity, processing capabilities, communication capabilities, etc.), and information for automatic media display control;
  - Cast device settings 334 for storing information associated with user accounts of the cast device application 322, including one or more of account access information, information for device settings (e.g., service tier, device model, storage capacity, processing capabilities, communication capabilities, etc.), and information for automatic media display control;
  - Media player application settings 336 for storing information associated with user accounts of one or more media player applications 324, including one or more of account access information, user preferences of media content types, review history data, and information for automatic media display control;

- Smart home device settings 338 for storing information associated with user accounts of the smart home applications 326, including one or more of account access information, information for one or more smart home devices (e.g., service tier, device model, storage capacity, processing capabilities, communication capabilities, etc.);
- Voice assistance data 340 for storing information associated with user accounts of the voice assistance application 328, including one or more of account access information, information for one or more voice-activated devices 104 (e.g., service tier, device model, storage capacity, processing capabilities, communication capabilities, etc.);
- User data 342 for storing information associated with users in the user domain, including users' subscriptions (e.g., music streaming service subscriptions, video streaming service subscriptions, newsletter subscriptions), user devices (e.g., devices registered in the device registry 118 associated with respective users, device nicknames, device groups), user accounts (e.g., users' email accounts, calendar accounts, financial accounts), and other user data;
- User voice profiles 344 for storing voice profiles of the users in the user domain, including, for example, voice models or voice fingerprints of the users and comfortable volume level thresholds of the users; and
- Alternate LED pattern criteria 345 for storing criteria information for determining when an alternate LED pattern may be displayed at a voice-activated device 104 in lieu of a standardized or default LED pattern;
- Device registration module 348 for managing the device registry 118;
- Voice processing module 350 for processing audio inputs or voice messages collected in an environment surrounding the electronic device 104; and
- Alternate LED output instructions 350 for storing output instructions for LED patterns that maybe displayed at a voice-activated device 104 in lieu of standardized or default LED patterns.

In some implementations, the data structure for the alternate LED output instructions 350 is similar to the data structure for the received LED output instructions 254 (FIG. 2B), and includes the following for an LED pattern output instructions set in the data structure:
- An output instructions set identifier, which may include an alphanumeric identifier value and/or a name;
- Mappings or correspondences to one or more standardized/default LED pattern(s), which include identifiers of local LED patterns to which the received LED pattern is an alternative for display; and
- Output instructions 264, which store the actual instructions or information based on which the LED control module 240 displays the LED pattern. The output instructions or information includes information such as, for example, a sequence of which LEDs to light up and when and the colors of the LEDs to be lit up.

In some implementations, the voice assistance server system 112 is primarily responsible for processing of voice inputs, and thus one or more of the programs, modules, and data structures in memory 206 described above with reference to FIG. 2 are included in respective modules in memory 306 (e.g., the programs, modules, and data structures included with voice processing module 238 are included in voice processing module 350). The voice-activated device 104 either transmits captured voice inputs to the voice assistance server system 112 for processing, or first pre-processes the voice inputs and transmits the pre-processed voice inputs to the voice assistance server system 112 for processing. In some implementations, the voice assistance server system 112 and the voice-activated device 104 has some shared and some divided responsibilities regarding processing of voice inputs, and the programs, modules, and data structures shown in FIG. 2 may be included in both or divided amongst the voice assistance server system 112 and the voice-activated device 104. Other programs, modules, and data structures shown in FIG. 2, or analogues thereof, may also be included in the voice assistance server system 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, the output instructions 258 and 264, and the output instructions for the alternate LED outputs 350-1, 350-2, 350-3, etc. are specified in accordance with a LED design language, examples of which are described in the '566 application referenced above.

In some implementations, the voice assistance server system 112 also stores information corresponding to the criteria for using alternate LED patterns. The information may be stored in, for example, memory 306. Such information includes, for example, holidays (dates of holidays and locales where a holiday is applicable) for which alternate LED patterns may be displayed and identifiers of the corresponding alternate LED patterns, applications with states or statuses that have associated alternate LED patterns, and so forth. The voice assistance server system 112 may use this information to determine if the criteria for using alternate LED patterns are satisfied (e.g., whether the request in the voice input referenced a holiday that is occurring, whether the voice input is directed to an application whose states and statuses may be indicated using alternate LED patterns).

Example Processes

Figure 4:
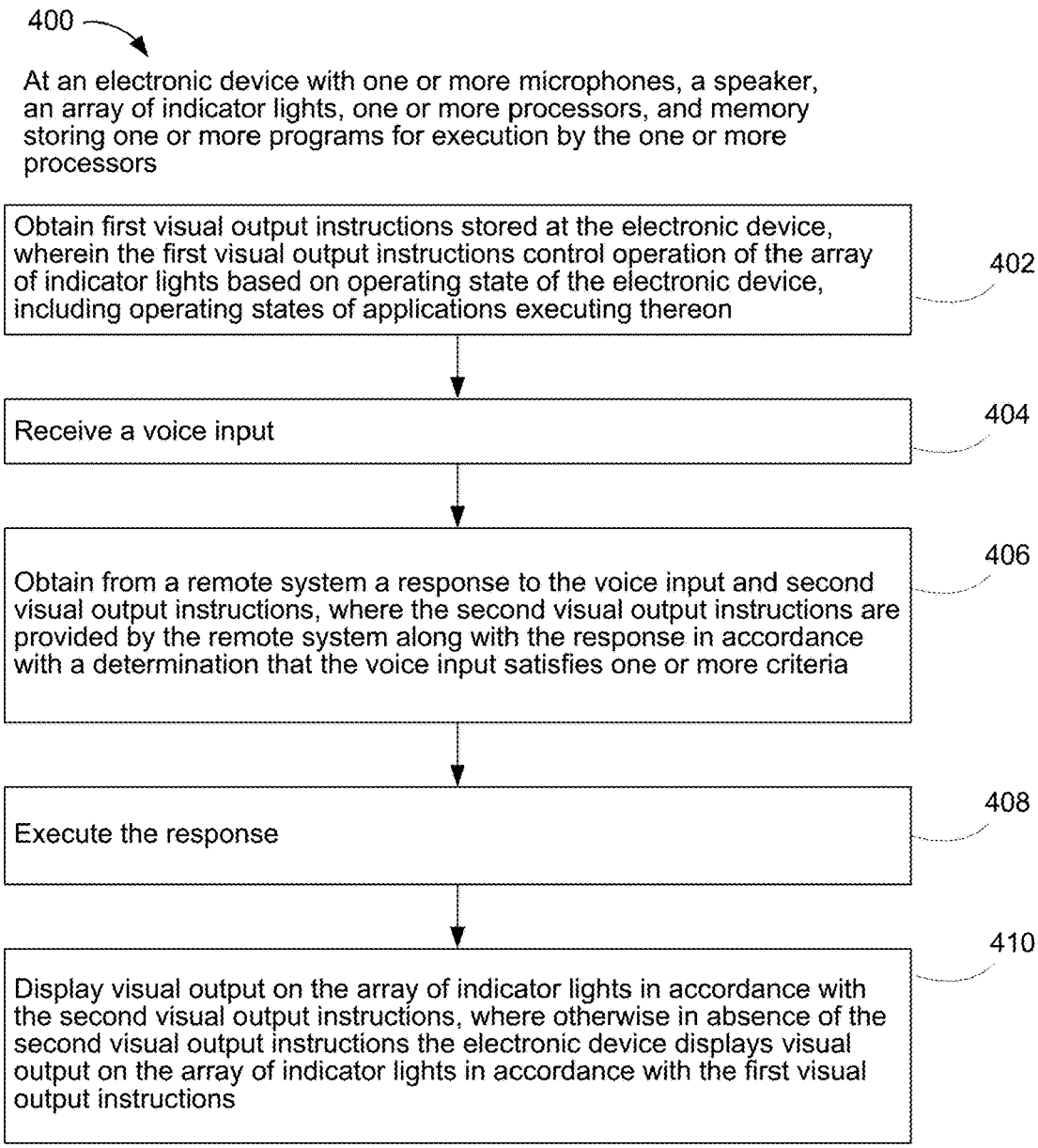
FIG. 4 illustrates a flow diagram of an example process of displaying a server-provided alternate LED pattern, in accordance with some implementations.

FIG. 4 illustrates a flow diagram of an example process 400 of displaying a server-provided alternate LED pattern, in accordance with some implementations. In some implementations, the process 400 is implemented at an electronic device with one or more microphones, a speaker, an array of indicator lights, one or more processors, and memory storing one or more programs for execution by the one or more processors (e.g., voice-activated device 104).

The electronic device obtains (402) first visual output instructions stored at the electronic device, where the first visual output instructions control operation of the array of indicator lights based on operating state of the electronic device, including operating states of applications executing thereon. The voice-activated device 104 accesses local LED output instructions 252 stored in the memory 206. The LED control module 240 displays LED light patterns on the array of LEDs based on these local LED output instructions 252;

the instructions directs the LED control module 240 which LEDs to turn on/off and when, and the colors of the LEDs to be lit.

The electronic device receives (404) a voice input. The voice-activated device 104 detects and captures an utterance of a voice input from a user 102. The voice-activated device 104 transmits the captured voice input to the voice assistance server system 112 for processing.

The electronic device obtains (406) from a remote system a response to the voice input and second visual output instructions, where the second visual output instructions are provided by the remote system along with the response in accordance with a determination that the voice input satisfies one or more criteria. The voice-activated device 104 receives from the voice assistance server system 112 a response to the voice input and alternate LED output instructions 350, which the voice-activated device 104 stores in memory 206 under received LED output instructions 254. The response may be generated by the voice assistance server 112 (e.g., by voice processing module 248), and may include an audible output and instructions to output the audible output, and instructions to perform particular operations. In some implementations, the response also includes instructions for the voice-activated device 104 to use the alternate LED output instructions instead of the corresponding default, local LED output instructions. The voice-activated device 104 receives the alternate LED output instructions 350, along with the response, from the voice assistance server system 112 in accordance with a determination that the voice input satisfies one or more criteria.

In some implementations, the voice assistance server system 112 determines whether one or more criteria for alternate LED patterns are satisfied. The criteria may include whether the voice input requests information or content associated with a holiday, and so on.

The electronic device (408) executes the response. The voice-activated device 104 performs operations in accordance with instructions included in the response, and outputs output (e.g., audible output) in accordance with the response.

The electronic device (410) displaying visual output on the array of indicator lights in accordance with the second visual output instructions, where otherwise in absence of the second visual output instructions the electronic device displays visual output on the array of indicator lights in accordance with the first visual output instructions. The voice-activated device 104 displays a pattern on the array of LEDs in accordance with the alternate LED output instructions received from the voice assistant server system 112. In the absence of the alternate LED output instructions or instructions in the response to use the alternate LED output instructions, the voice-activated device 104 displays a pattern on the array of LEDs in accordance with the local LED output instructions.

In some implementations, the voice-activated device 104 downloads alternative LED output instructions at certain times (e.g., download Halloween-related LED output instructions some time before (e.g., 2 weeks before) Halloween), and on Halloween, the default LED output instructions are substituted with the Halloween-related LED output instructions for the day. For example, on Halloween, when the voice-activated device 104 says "Good morning" after being awakened, a Halloween-themed LED pattern (e.g., same sequence of LEDs as the default "Good morning" pattern, but with black and orange lights) is displayed in lieu of the default "Good morning" pattern.

In some implementations, displaying the visual output on the array of indicator lights in accordance with the second visual output instructions is concurrent with executing the response.

In some implementations, the electronic device obtains from the remote system audible output instructions associated with the second visual output instructions, and outputs audible output on the speaker in accordance with the audible output instructions, where the audible output instructions are supplemental to an audible output associated with the response to the voice input. Special or alternative sounds may accompany alternate LED output patterns. The voice-activated device 104 receives the instructions and data for the alternative sounds along with the alternate LED output instructions, and outputs the alternative sound, which is in addition to an audible output of the response to the voice input, in accordance with the instructions when outputting the alternate LED pattern.

In some implementations, the one or more criteria include: the voice input including a request associated with a holiday specified in the voice input. For example, if the voice input includes a request to play Christmas songs or asks for a number of days to Christmas, when the voice-activated device 104 is in the text-to-speech processing state, the voice-activated device 104 may display a text-to-speech status LED pattern with red and green colors instead of default colors.

In some implementations, the one or more criteria include: a date on which the voice input is received corresponds to a holiday. For example, if the voice-activated device 104 is awakened on Christmas, the LED pattern displayed when the voice-activated device 104 responds to being awakened with a "Good morning" audible output may have red and green colors instead of default colors.

In some implementations, the one or more criteria include: the voice input is associated with an on-going game session at the electronic device. For example, if the voice-activated device 104 is running a game application, text-to-speech processing state LED patterns displayed for voice inputs interacting with an outstanding game session of the game application may have different patterns and/or colors for each user-player in lieu of the default patterns and colors.

In some implementations, additional criteria for displaying alternate LED patterns (e.g., alternate pattern for the text-to-speech processing state instead of the default pattern) include particular weather conditions (when the request is for a weather report), poor traffic conditions (when the request is for a traffic or commute report).

In some implementations, the array of indicator lights includes an array of LED lights. In some implementations, the array of indicator lights includes full-color lights. The array of indicator lights may be LED lights, and may be full-color lights (e.g., full-color LED lights).

FIG. 5 illustrates a flow diagram of an example process 500 of displaying a server-provided alternate LED pattern, in accordance with some implementations. In some implementations, the process 500 is implemented at an electronic device with one or more microphones, a speaker, an array of indicator lights, one or more processors, and memory storing one or more programs for execution by the one or more processors (e.g., voice-activated device 104).

The electronic device obtains (502) first visual output instructions stored at the electronic device, where the first visual output instructions control operation of the array of indicator lights based on operating state of the electronic device, including operating states of applications executing thereon. The voice-activated device 104 accesses local LED output instructions 252 stored in the memory 206. The LED control module 240 displays LED light patterns on the array of LEDs based on these local LED output instructions 252; the instructions direct the LED control module 240 which LEDs to turn on/off and when, and the colors of the LEDs to be lit.

The electronic device obtains (504) from a remote system second visual output instructions. The voice-activated device 104 receives from the voice assistance server system 112 alternate LED output instructions 350, which the voice-activated device 104 stores in memory 206 under received LED output instructions 254. The voice-activated device 104 receives the alternate LED output instructions 350 at certain times (e.g., periodically; a predefined number of days before a holiday with which the alternate LED output instructions are associated; along with a response to a voice input).

The electronic device (506) performs an operation. The voice-activated device 104 may perform an operation in accordance with a response to a voice input or as part of running an application.

In association with performing the operation, the electronic device determines (508) whether one or more alternate visual output criteria are satisfied. The voice-activated device 104 determines if conditions (e.g., the contents of the voice input that triggered the operation, when the voice input was received) with which the operation is associated satisfy the criteria for using alternate LED output instructions. For example, if the operation is to output an audible greeting, the voice-activated device 104 determines if the one or more criteria (e.g., is today a particular holiday) are satisfied.

In accordance with a determination that the alternate visual output criteria are satisfied, the electronic device displays (510) visual output on the array of indicator lights in accordance with the second visual output instructions. If the one or more criteria are satisfied, the voice-activated device 104 displays light patterns on the array of LEDs in accordance with the alternate LED output instructions.

In accordance with the determination that the alternate visual output criteria are not satisfied, the electronic device displays (512) visual output on the array of indicator lights in accordance with the first visual output instructions. If the one or more criteria are satisfied, the voice-activated device 104 displays light patterns on the array of LEDs in accordance with the local LED output instructions.

In some implementations, if the voice input involves a group of devices (e.g., the request is for Christmas songs to be played on a group of devices), the devices in the group display light patterns in accordance with the alternate LED output instructions.

Table 1 illustrates examples of particular user requests or outputs by an voice-activated device 104 and a corresponding LED light pattern that may be displayed.

TABLE 1

| Request or output | Light pattern shown |
| --- | --- |
| "Play some Christmas music" "How many days until Christmas?" | Same pattern as default light pattern for text-to-speech processing state, but with red and green colored lights |
| "Play some Hannukah music" "How many days until Hannukah?" | Same pattern as default light pattern for text-to-speech processing state, but with blue and silver colored lights |

TABLE 1-continued

| Request or output | Light pattern shown |
| --- | --- |
| After user awakens device, device says greeting (e.g., "Good morning"), or the user says "Good morning" to the device, on Christmas day, Hannukah days, or other religious holiday | Default light pattern for text-to-speech processing state |
| After user awakens device, device says greeting (e.g., "Good morning"), or the user says "Good morning" to the device, on New Year's Eve or New Year's Day | White flickering LED lights (evocative of falling confetti) |
| After user awakens device, device says greeting (e.g., "Good morning"), or the user says "Good morning" to the device, on Thanksgiving | Red/orange flickering LED lights (evocative of falling leaves) |
| After user awakens device, device says greeting (e.g., "Good morning"), or the user says "Good morning" to the device, on July 4th, Presidents' Day, Veterans Day, Memorial Day | Red/white/blue light pattern |

In some implementations, an alternate LED pattern for a state or status has similar characteristics with the default LED pattern for the same state or status, but also different characteristics that set the two patterns apart. For example, the default and alternate pattern for a state may have the same light motion or animation, but different light colors.

Physical Features of a Voice-Activated Electronic Device

Figure 6B:
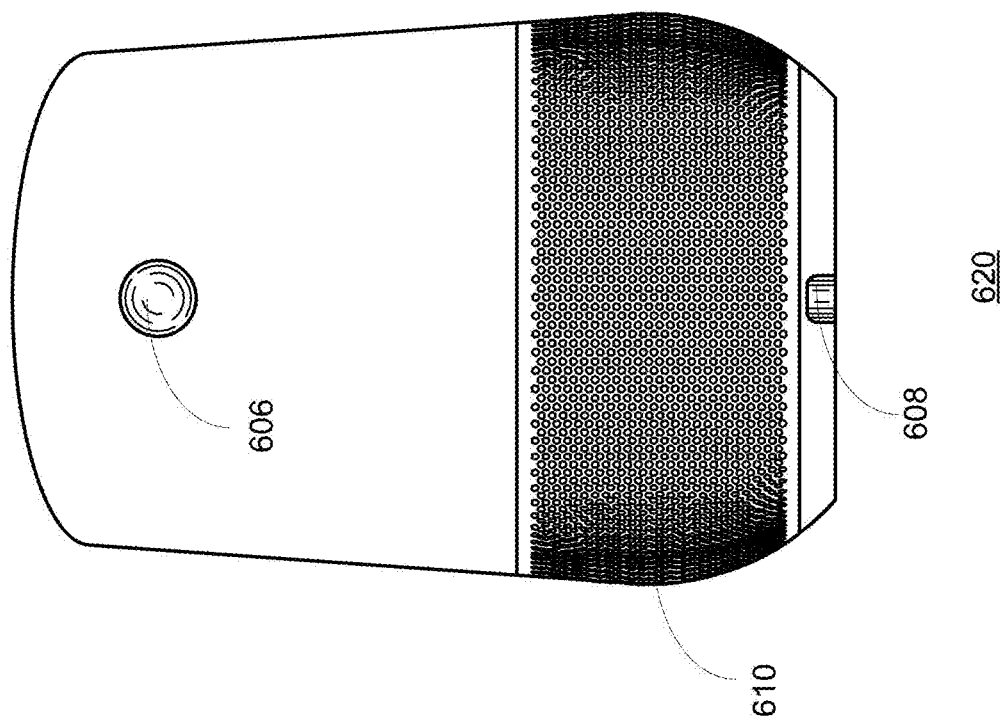
FIGS. 6A and 6B are a front view and a rear view of a voice-activated electronic device in accordance with some implementations.
Figure 6A:
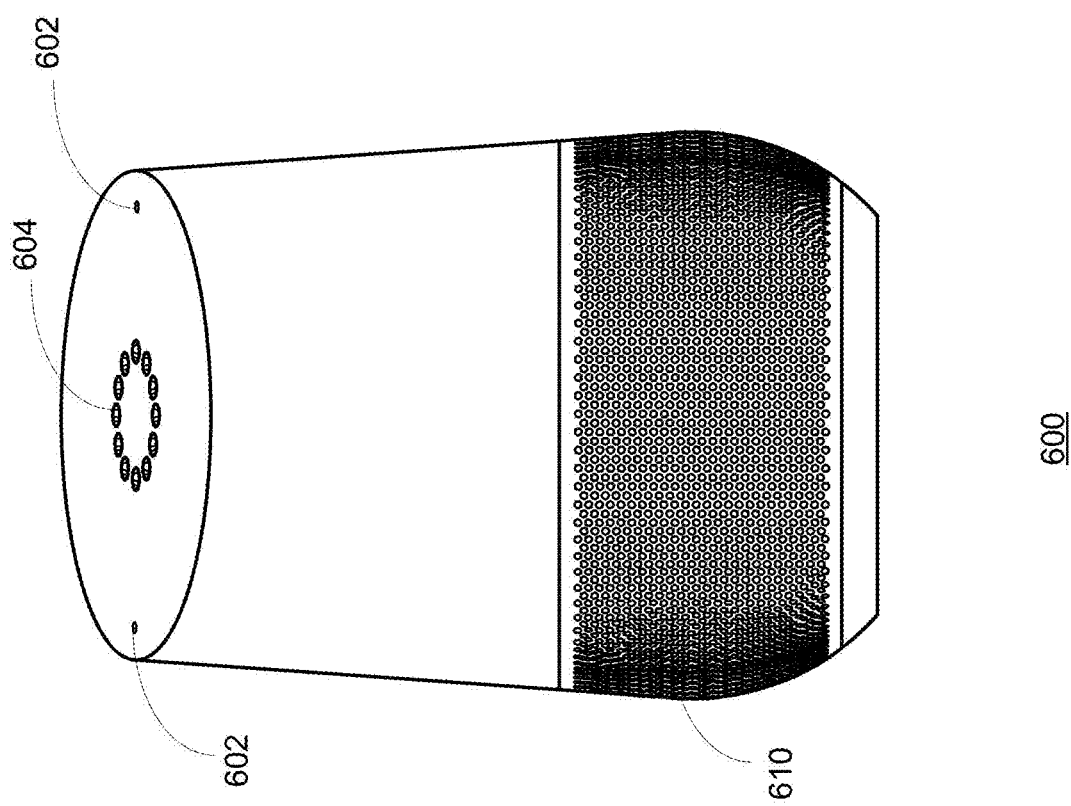

FIGS. 6A and 6B are a front view 600 and a rear view 620 of an example voice-activated device 104 in accordance with some implementations. The voice-activated device 104 is designed as warm and inviting, and fits naturally in many areas of a home. The voice-activated device 104 includes one or more microphones 602 and an array of full color LEDs 604. The full color LEDs 604 may be hidden under a top surface of the voice-activated device 104 and in some implementations are invisible to the user when they are not lit. In some implementations, the array of full color LEDs 604 is physically arranged in a ring. In some implementations, the array of full color LEDs is physically arranged in a grid. Further, the rear side of the voice-activated device 104 optionally includes a power supply connector 608 configured to couple to a power supply. In some implementations, the voice-activated device 104 also includes a base with a speaker grille 610 that protects a speaker hidden under the speaker grille.

In some implementations, the voice-activated device 104 presents a clean look having no visible button, and the interaction with the voice-activated device 104 is based on voice and touch gestures (e.g., with a touch-sensitive surface (not shown) on the voice-activated device 104). Alternatively, in some implementations, the voice-activated device 104 includes a limited number of physical buttons (e.g., a button 606 on its rear side), and the interaction with the voice-activated device 104 is further based on press on the button in addition to the voice and touch gestures.

LED Design Language for Visual Affordance of Voice User Interface

In some implementations, the voice-activated device 104 includes an array of full color light emitting diodes (LEDs) rather than a full display screen. A LED design language is adopted to configure illumination of the array of full color LEDs and enable different visual patterns indicating different voice processing state of the voice-activated device 104.

The LED Design Language consists of a grammar of colors, patterns, and specific motion applied to a fixed set of full color LEDs. The elements in the language are combined to visually indicate specific device states during the use of the voice-activated device 104. In some implementations, illumination of the full color LEDs aims to clearly delineate the passive listening and active listening states of the voice-activated device 104 among other important states. Placement of the full color LEDs complies with physical constraints of the voice-activated device 104, and the array of full color LEDs may be used in a speaker that is made by a third party original equipment manufacturer (OEM) based on specific technology (e.g., Google Assistant).

When the array of full color LEDs is used in a speaker that is made by a third party OEM based on specific technology, the full color LEDs and the LED design language are configured to fit a corresponding physical user interface of the OEM speaker. In this situation, device states of the OEM speaker remain the same, while specific visual patterns representing the device states could be varied (for example, the colors of the full color LEDs could be different but are displayed with similar animation effects).

In a voice-activated device 104, passive listening occurs when the voice-activated device 104 processes audio inputs collected from its surrounding environment but does not store the audio inputs or transmit the audio inputs to any remote server. In contrast, active listening occurs when the voice-activated device 104 stores the audio inputs collected from its surrounding environment and/or shares the audio inputs with a remote server. In accordance with some implementations of this application, the voice-activated device 104 only passively listens to the audio inputs in its surrounding environment without breaching privacy of users of the voice-activated device 104.

Figure 6C:
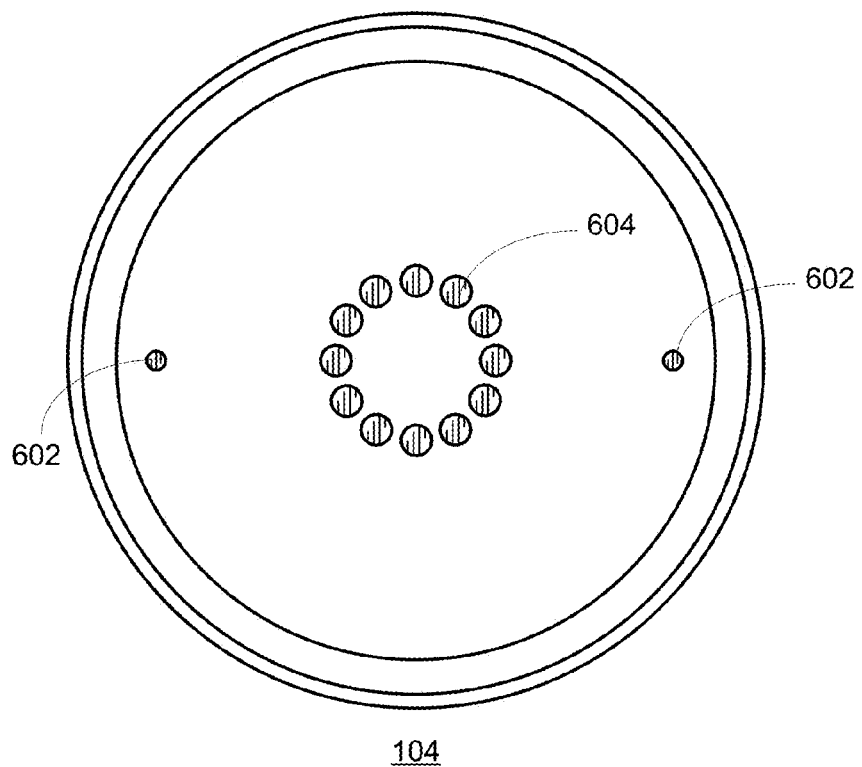
FIG. 6C is a top view of a voice-activated electronic device in accordance with some implementations.
Figure 6D:
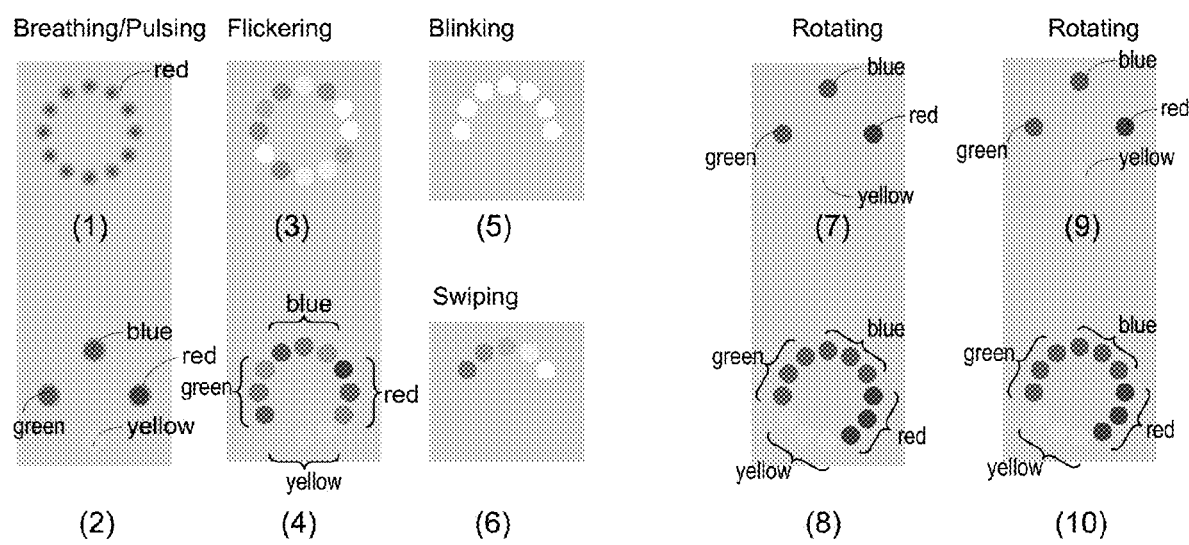
FIG. 6D shows visual patterns displayed by an array of full color LEDs for indicating voice processing states in accordance with some implementations.

FIG. 6C is a top view of a voice-activated device 104 in accordance with some implementations, and FIG. 6D shows visual patterns displayed by an array of full color LEDs for indicating voice processing states in accordance with some implementations. In some implementations, the voice-activated device 104 does not include any display screen, and the full color LEDs provide a simple and low cost visual user interface compared with a full display screen. The full color LEDs may be hidden under a top surface of the electronic device and invisible to the user when they are not lit. In some implementations, the top surface of the voice-activated device 104 is touch-sensitive. Referring to FIGS. 6C and 6D, in some implementations, the array of full color LEDs are physically arranged in a ring. In some implementations, the lights track a user's physical interactions with the electronic device 104. For example, as shown in FIG. 6D(6), the array of full color LEDs 604 may light up sequentially to track a clockwise or counter-clockwise swipe on a touch-sensitive top surface of the voice-activated device. More details on visual patterns associated with voice processing states of the electronic device 104 are explained below with reference to FIGS. 6D(1)-6D(8).

A method is implemented at the electronic device 104 for visually indicating a voice processing state. The electronic device 104 collects via the one or more microphones 602 audio inputs from an environment in proximity to the electronic device, and processes the audio inputs. The processing includes one or more of identifying and responding to voice inputs from a user in the environment. The electronic device 104 determines a state of the processing from among a plurality of predefined voice processing states. For each of the full color LEDs 604, the electronic device 104 identifies a respective predetermined LED illumination specification associated with the determined voice processing state. The illumination specification includes one or more of an LED illumination duration, pulse rate, duty cycle, color sequence and brightness. In some implementations, the electronic device 104 determines that the voice processing state is associated with one of a plurality of users, and identifies the predetermined LED illumination specifications of the full color LEDs 604 by customizing at least one of the predetermined LED illumination specifications (e.g., the color sequence) of the full color LEDs 604 according to an identity of the one of the plurality of users. For example, a LED illumination specification can: (a) cause all of the LEDs to pulse or "breathe" together in a single color (e.g., pulse between different red intensities, as shown in FIG. 6D(1)); (b) cause particular LEDs to light in different colors (e.g., illuminate top, right, bottom and left individual LEDs in blue, red, yellow and green respectively, as shown in FIG. 6D(2), or illuminate all of the LEDs, each in a different color, as shown in FIG. 6(D)(4)); (c) cause all of the LEDs to flicker between different colors (e.g., flicker between white and different gray shades, as shown in FIG. 6D(3)); or cause a defined set of the LEDs to blink (e.g., to blink from white to off, as shown in FIG. 6D(5)).

Further, in some implementations, in accordance with the determined voice processing state, the colors of the full color LEDs include a predetermined set of colors. For example, referring to FIGS. 6D(2), 6D(4) and 6D(7)-(10), the predetermined set of colors include Google brand colors including blue, green, yellow and red, and the array of full color LEDs is divided into four quadrants each associated with one of the Google brand colors.

In accordance with the identified LED illumination specifications of the full color LEDs, the electronic device 104 synchronizes illumination of the array of full color LEDs to provide a visual pattern indicating the determined voice processing state. In some implementations, the visual pattern indicating the voice processing state includes a plurality of discrete LED illumination pixels. In some implementations, the visual pattern includes a start segment, a loop segment and a termination segment. The loop segment lasts for a length of time associated with the LED illumination durations of the full color LEDs and is configured to match a length of the voice processing state.

In some implementations, the electronic device 104 has more than twenty different device states (including the plurality of predefined voice processing states) that are represented by the LED Design Language. Optionally, the plurality of predefined voice processing states includes one or more of a hot word detection state, a listening state, a thinking state and a responding state.

As described herein, in accordance with some implementations, the voice-activated electronic device 104 may display non-default, alternate visual output in accordance with a determination that a voice input or operation of the electronic device 104 satisfies one or more criteria. The non-default, alternate visual output may be displayed in lieu of a default visual output (e.g., any of the example default visual output colors and/or patterns/sequences described with reference to FIG. 6D), when otherwise the default visual output would have been displayed. As described herein, in some implementations the information or instructions for displaying the non-default visual output is provided by a remote system (e.g., a server system) and/or is stored in the electronic device 104 for use when alternate visual output criteria are satisfied. As described herein, in some implementations, the alternate visual output characteristics may be specified in the received LED Output instructions 254 (FIG. 2) and the default or predefined visual output instructions may be specified in the local LED output instructions 252 (FIG. 2).

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a server system communicatively coupled to an electronic device with one or more microphones, a speaker and an array of indicator lights:
obtaining a voice input from the electronic device while operation of the array of indicator lights is being controlled by first visual output instructions based on an operating state of the electronic device, the operating state of the electronic device including operating states of applications executing thereon, wherein the first visual output instructions are stored at the electronic device and are configured to control operation of the array of indicator lights based on operating state of the electronic device;
determining whether the voice input satisfies one or more criteria;
in accordance with a determination that the voice input satisfies the one or more criteria, providing a response to the voice input and second visual output instructions; and
transmitting the response to the electronic device along with the second visual output instructions, thereby enabling the electronic device to change operation of the array of indicator lights to respond to the second visual output instructions instead of the first visual output instructions.

2. The method of claim 1, wherein the response to the voice input includes a first response, further comprising:
in accordance with a determination that the voice input does not satisfy the one or more criteria, providing a second response to the voice input; and
transmitting the second response to the electronic device without the second visual output instructions, wherein the electronic device is configured to display visual output on the array of indicator lights in accordance with the first visual output instructions, in accordance with a determination of an absence of the second visual output instructions.

3. The method of claim 1, wherein visual output is displayed on the array of indicator lights in accordance with the second visual output instructions concurrently with execution of the response on the electronic device.

4. The method of claim 1, further comprising:
providing audible output instructions associated with the second visual output instructions to the electronic device, thereby enabling the electronic device to output audible output on the speaker in accordance with the audible output instructions, wherein the audible output instructions are supplemental to an audible output associated with the response to the voice input.

5. The method of claim 1, wherein the one or more criteria comprise: the voice input including a request associated with a holiday specified in the voice input.

6. The method of claim 1, wherein the one or more criteria comprise: a date on which the voice input is received corresponds to a holiday.

7. The method of claim 1, wherein the one or more criteria comprise: the voice input is associated with an on-going game session at the electronic device.

8. The method of claim 1, the electronic device including a first electronic device, wherein the server system is configured to host a user domain having a plurality of users, and the first electronic device is associated with a device group including a plurality of electronic devices, and the second visual output instructions are associated with a predetermined operation, further comprising:
   determining that the predetermined operation is directed to the device group; and
   causing each of the plurality of electronic devices to perform the predetermined operation and display light patterns in accordance with the second visual output instructions.

9. The method of claim 8, wherein the server system is configured to cause the plurality of electronic devices to perform the predetermined operation and display light patterns in accordance with the second visual output instructions by way of the first electronic device.

10. The method of claim 8, wherein the first electronic device is configured to:
   perform the predetermined operation;
   determine whether one or more alternate visual output criteria are satisfied; and
   in accordance with a determination that the alternate visual output criteria are satisfied, cause each of the plurality of electronic devices to perform the predetermined operation and display light patterns in accordance with the second visual output instructions.

11. A server system, wherein the server system is communicatively coupled to an electronic device with one or more microphones, a speaker and an array of indicator lights, comprising:
   one or more processors; and
   memory having instructions stored thereon, which when executed by the one or more processors causes the processors to perform operations, comprising:
      obtaining a voice input from the electronic device while operation of the array of indicator lights is being controlled by first visual output instructions based on an operating state of the electronic device, the operating state of the electronic device including operating states of applications executing thereon, wherein the first visual output instructions are stored at the electronic device and are configured to control operation of the array of indicator lights based on operating state of the electronic device;
      determining whether the voice input satisfies one or more criteria;
      in accordance with a determination that the voice input satisfies the one or more criteria, providing a response to the voice input and second visual output instructions; and
      transmitting the response to the electronic device along with the second visual output instructions, thereby enabling the electronic device to change operation of the array of indicator lights to respond to the second visual output instructions instead of the first visual output instructions.

12. The server system of claim 11, wherein each of the first and second output instructions includes a respective illumination specification that further includes one or more of an illumination duration, pulse rate, duty cycle, color sequence and brightness for each indicator light in the array of indicator lights.

13. The server system of claim 11, wherein the one or more criteria is associated with at least one of a weather condition and a traffic condition.

14. The server system of claim 11, wherein the array of indicator lights of the electronic device comprises an array of LED lights.

15. The server system of claim 11, wherein the array of indicator lights of the electronic device comprises full-color lights.

16. A non-transitory computer-readable medium, having instructions stored thereon, which when executed by one or more processors of a server system causes the processors to perform operations comprising:
   at the server system, wherein the server system is communicatively coupled to an electronic device with one or more microphones, a speaker and an array of indicator lights:
      obtaining a voice input from the electronic device while operation of the array of indicator lights is being controlled by first visual output instructions based on an operating state of the electronic device, the operating state of the electronic device including operating states of applications executing thereon, wherein the first visual output instructions are stored at the electronic device and are configured to control operation of the array of indicator lights based on operating state of the electronic device;
      determining whether the voice input satisfies one or more criteria;
      in accordance with a determination that the voice input satisfies the one or more criteria, providing a response to the voice input and second visual output instructions; and
      transmitting the response to the electronic device along with the second visual output instructions, thereby enabling the electronic device to change operation of the array of indicator lights to respond to the second visual output instructions instead of the first visual output instructions.

17. The non-transitory computer-readable medium of claim 16, wherein the array of indicator lights is configured to provide a visual pattern that conveys at least one of the operating states of the applications executed on the electronic device in real time.

18. The non-transitory computer-readable medium of claim 16, wherein the voice input is captured by the electronic device and received by the server system without any pre-processing.

19. The non-transitory computer-readable medium of claim 16, where the voice input is preprocessed by the electronic device from a voice message captured by the electronic device prior to being received by the server system.

20. The non-transitory computer-readable medium of claim 16, wherein the server system is configured to host a user domain having a plurality of users, and the electronic device is associated with one of the plurality of users in the user domain, and wherein the one or more criteria and the second visual output instructions are stored in association with the one of the plurality of users.

* * * * *